(12) United States Patent
Ahn et al.

(10) Patent No.: US 7,721,367 B2
(45) Date of Patent: May 25, 2010

(54) BED MATTRESS USING PERMEABLE REINFORCING MEMBER AND FOAMING MATERIAL, AND METHOD OF MANUFACTURING THE SAME

(75) Inventors: Yoo Soo Ahn, 176-3, SeoHyeon Dong, BunDang-Gu, SeongNam-Shi, Kyonggi-Do (KR); Sung Ho Ahn, Kyonggi-Do (KR)

(73) Assignee: Yoo Soo Ahn, Kyonggi-Do (KR)

( * ) Notice: Subject to any disclaimer, the term of this patent is extended or adjusted under 35 U.S.C. 154(b) by 723 days.

(21) Appl. No.: 11/486,587

(22) Filed: Jul. 13, 2006

(65) Prior Publication Data

US 2007/0044244 A1     Mar. 1, 2007

(30) Foreign Application Priority Data

Sep. 1, 2005     (KR) .................... 10-2005-0081083
Feb. 17, 2006    (KR) .................... 10-2006-0015364

(51) Int. Cl.
A47C 27/05     (2006.01)
A47C 27/20     (2006.01)

(52) U.S. Cl. .............................. 5/716; 5/721
(58) Field of Classification Search ............ 5/716, 5/721, 655.7, 642, 654.1; 267/83, 84; 297/452.49, 297/452.5, 452.51
See application file for complete search history.

(56) References Cited

U.S. PATENT DOCUMENTS

| | | | | |
|---|---|---|---|---|
| 2,192,463 A * | 3/1940 | Wesley | .......................... | 5/248 |
| 2,626,408 A * | 1/1953 | Wesley | .......................... | 5/721 |
| 3,005,213 A * | 10/1961 | Brown et al. | ............ | 297/452.52 |
| 3,099,844 A * | 8/1963 | Bolesky | ................. | 297/452.5 |
| 3,116,196 A * | 12/1963 | Terry | .......................... | 442/30 |
| 3,142,073 A * | 7/1964 | Stern | .......................... | 267/83 |
| 3,204,016 A | 8/1965 | Sanger et al. | | |
| 3,239,584 A * | 3/1966 | Terry et al. | ................ | 264/46.7 |
| 3,242,510 A * | 3/1966 | Goldstone | .............. | 297/452.21 |
| 3,273,179 A * | 9/1966 | Ridenour | ..................... | 267/83 |
| 3,459,611 A * | 8/1969 | Joseph et al. | ................. | 156/78 |
| 3,719,963 A * | 3/1973 | Bullock, Jr. | ................... | 5/718 |
| 3,818,560 A * | 6/1974 | Bulloch, Jr. | .................. | 29/91.1 |
| 3,840,269 A * | 10/1974 | Ambrose | ............... | 297/452.56 |
| 3,906,560 A * | 9/1975 | Bulloch, Jr. | .................... | 5/721 |
| 3,942,926 A * | 3/1976 | Bulloch, Jr. | ............. | 425/126.1 |
| 4,003,113 A * | 1/1977 | Bulloch, Jr. | ................. | 29/91.1 |
| 4,288,903 A * | 9/1981 | Matsuda et al. | ............... | 29/416 |
| 4,811,439 A | 3/1989 | Siegel et al. | | |

(Continued)

FOREIGN PATENT DOCUMENTS

JP     51104019 A     9/1976

(Continued)

*Primary Examiner*—Robert G Santos
(74) *Attorney, Agent, or Firm*—Edwards Angell Palmer & Dodge LLP; Kongsik Kim

(57) ABSTRACT

Disclosed herein is a bed mattress and a method of manufacturing the same, in which a permeable reinforcing member is provided at an upper portion and a lower portion of a spring assembly which is one of frame constituents of the bed mattress, and a foaming material is disposed on the permeable reinforcing member so as to be foamed, so that the spring assembly and the foaming material are integrally formed while the foaming material is expanded through fine holes and/or foam expansion holes of the permeable reinforcing member.

4 Claims, 15 Drawing Sheets

U.S. PATENT DOCUMENTS

2007/0044244 A1 * 3/2007 Ahn et al. .................... 5/721

FOREIGN PATENT DOCUMENTS

| | | | |
|---|---|---|---|
| JP | 62-128047 | A | 6/1987 |
| JP | 63-196254 | A | 8/1988 |
| JP | 1-100643 | A | 4/1989 |
| WO | 9521048 | A1 | 8/1995 |

* cited by examiner portion where a foam is further expanded convexedly portion where a foam is further expanded convexedly portion where a foam is further expanded convexedly

BED MATTRESS USING PERMEABLE REINFORCING MEMBER AND FOAMING MATERIAL, AND METHOD OF MANUFACTURING THE SAME

BACKGROUND OF THE INVENTION

1. Field of the Invention

The present invention relates to a bed mattress using a permeable reinforcing member and a foaming material, and a method of manufacturing the same, and more particularly to such a bed mattress and a method of manufacturing the same, in which a permeable reinforcing member is provided at an upper portion and a lower portion of a spring assembly which is one of frame constituents of the bed mattress, and a foaming material is disposed on the permeable reinforcing member so as to be foamed, so that the spring assembly and the foaming material are integrally formed while the foaming material is expanded through fine holes and/or foam expansion holes of the permeable reinforcing member.

2. Background of the Related Art

In general, a bed mattress is mounted on a bed frame and is used as means adapted to provide a cushion force and buffering force. The bed mattress basically includes a spring assembly, an intermediate member laminatedly attached on the upper and lower surfaces of the spring assembly, an edge foamer fittingly attached to the lateral surface of the spring assembly, and a cover member for protecting the surfaces of the intermediate member and the edge former.

Herein, a process for manufacturing a conventional bed mattress will be hereinafter described in brief with reference to FIG. 14.

Referring to FIG. 14, first, a spring assembly 10 is fabricated, which includes coil springs 12 arranged along row and column directions over the entire area of the bed mattress in such a fashion as to be spaced apart from one another at regular intervals, and a helical coil 14 for securely engaging the coil springs 12 with one another.

Subsequently, an edge foamer 30 as a support means is fittingly attached to the lateral surface of the spring assembly 10.

Thereafter, a multi-layered cushion means including a felt and a non-woven fabric as an intermediate member 32 is continuously laminated on the upper and lower surfaces of the spring assembly 10.

Finally, the upper and lower surfaces and the circumferential edge surface of the intermediate member 32 as well as the outer surface of the edge foamer 30 are covered with a cover member 28, and then a seam portion of the cover member 28 is hermetically sealed with a sealing means.

Therefore, when a user sleeps a sleep, a load exerted to the bed mattress is absorbed and buffered by means of a cushion force of the intermediate member and a buffering force of the spring so that he or she can feels convenience and comfort.

However, this conventional structure of the bed mattress has shortcomings in that the manufacturing process thereof is complicated and various processes are required, which leads to an increase in the manufacturing cost and a decrease in workability.

That is, since the conventional bed mattress manufactured by the above-mentioned process is manufactured through various processes like a process in which a multi-layered intermediate member such as a felt and a non-woven fabric is laminatedly attached on the upper and lower surfaces of the spring assembly, etc., the manufacturing cost and the labor cost are increased and the manufacturing speed is lowered to thereby deteriorate unit productivity.

Particularly, for the conventional bed mattress, there occurs a problem in that a noise (for example, a noise due to the contact between the springs or a creaking sound due to compression of the springs) is generated by means of a load exerted to the bed mattress during its use or an aging and wearing of the springs according to the long-term use of the mattress.

SUMMARY OF THE INVENTION

Accordingly, the present invention has been made in view of the aforementioned problems occurring in the prior art, and it is an object of the present invention to provide a bed mattress using a permeable reinforcing member and a foaming material, and a method of manufacturing the same, in which the permeable reinforcing member is provided at an upper portion and/or a lower portion of a spring assembly for the bed mattress, and a foaming material is disposed on the permeable reinforcing member so as to be foamed, so that the permeable reinforcing member is embedded into the foaming material and simultaneously the spring assembly and the foaming material are integrally formed with each other while the foaming material is expanded through fine holes of the permeable reinforcing member.

Another object of the present invention is to provide a bed mattress using a permeable reinforcing member and a foaming material, and a method of manufacturing the same, in which the permeable reinforcing member is penetratingly formed thereon with a plurality of foam expansion holes arranged along row and column directions in such a fashion as to be spaced apart from one another at regular intervals so as to further increase the foaming degree of the foaming material through the foam expansion holes and embedded an engagement portion between a spring of the spring assembly and a helical coil, and/or a seam portion between the springs or a space portion between the springs into the foaming material expanded through the foam expansion holes, to thereby further enhance the bonding force between the spring assembly including the springs and the foaming material.

Still another object of the present invention is to provide a bed mattress structure in which a foaming material is provided at an upper portion and a lower portion of the spring assembly as well as the lateral foaming is also progressed at a lateral surface of the spring assembly, so that a lateral foaming material is integrally formed with the spring assembly at the lateral surface of the spring assembly.

Yet another object of the present invention is to provide a bed mattress structure in which a foam of a foaming material passes through through-holes of an intermediate layer and then adheres to respective springs or helical coils of a spring assembly so as to be coagulated, so that a crack is prevented from being generated due to a fatigue load accumulated at the springs and helical coils to thereby prolong the lifespan of the interior materials of the mattress and the mattress itself as well as reduce a noise of the spring itself.

Accomplishment of the above objects of the present invention enables the elimination of various other processes including an existing process in which a multi-layered intermediate member such as a felt and a non-woven fabric is laminatedly attached on the upper and lower surfaces of the spring assembly, etc., so that the manufacturing cost and the labor cost can be substantially reduced and unit productivity can improved. Particularly, an excellent bonding force between the spring assembly and the foaming material is provided through a process of foaming the foaming material using the permeable reinforcing member, a noise due to the contact between the springs can be prevented from being generated, and the lifespan of the bed mattress can be lengthened.

To accomplish the above object, according to one aspect of the present invention, there is provided a bed mattress including a spring assembly consisting of a plurality of springs arranged along row and column directions over the entire area of the bed mattress, and a helical coil for securely engaging the springs with one another, the bed mattress comprising: a permeable reinforcing member provided at an upper surface and/or a lower surface of the spring assembly, the permeable reinforcing member being formed of a single or multi-layered structure; and a foaming material disposed on the outer surface of the permeable reinforcing member so as to be foamed, wherein the permeable reinforcing member is embedded into the foaming material and simultaneously the spring assembly and the foaming material are integrally formed with each other through the foaming of the foaming material passing through a plurality of fine holes formed on the permeable reinforcing member.

A cushion material as the foaming material is a polyurethane foam and is intended to be foamed while being cured. Thus, in case where two liquids, i.e., a polyether polyol and a polyfunctional isocyanate are mixed with each other, they are cured while being subjected to a crosslinking reaction where the two liquids are bonded to each other. Particularly, an example of the foaming material may include a foaming material such as polyethylene, etc., besides polyurethane. Also, all of the foaming materials made of a soft material, especially, a memory foam may be taken as an example of the foaming material.

In a preferred embodiment, the permeable reinforcing member is further formed thereon with a plurality of foam expansion holes arranged along row and column directions in such a fashion as to be spaced apart from one another at regular intervals so that a part of the foaming material is permeated through the inside of the spring assembly in an increased amount through the foam expansion holes so as to be convexedly foamed and an engagement portion between a spring of the spring assembly and a helical coil and/or a seam portion between springs or a space portion between the springs are embedded into the convexedly foamed part of the foaming material.

Particularly, the permeable reinforcing member is a fine mesh having fine holes each of which is 1~30 mm×1~30 mm in size and/or foam expansion holes each of which is 3 to 80 mm in diameter.

Also, the permeable reinforcing member is a non-woven fabric having foam expansion holes each of which is 3 to 80 mm in diameter.

Preferably, the diameter of the foam expansion holes of the permeable reinforcing member is within a range between 25 mm and 35 mm.

In a preferred embodiment, preferably, the foam expansion holes are penetratingly formed on the permeable reinforcing member in such a fashion as to be arranged at a position corresponding to the engagement portion between each spring of the spring assembly and the helical coil and/or the seam portion between springs or the space portion between the springs.

Further, an edge foamer is fittingly attached to the lateral surface of the spring assembly, but a lateral foaming material is not foamed along the lateral surface of the spring assembly.

To accomplish the above object, according to another aspect of the present invention, there is also provided a method of manufacturing a bed mattress including a spring assembly consisting of a plurality of springs and a helical coil for securely engaging the springs with one another, the method comprising the steps of: a first step of fixedly disposing a single or multi-layered permeable reinforcing member on the upper surface of the spring assembly; a second step of seating the spring assembly in a foaming space of a foaming apparatus filled with a foaming material such that the outer surface of the permeable reinforcing member is in close contact with the foaming space of the foaming apparatus and then the foaming material is foamed; a third step of allowing the foaming material to be foamed through fine holes of the permeable reinforcing member to cause the permeable reinforcing member and the partial upper portion of the spring assembly to be embedded into the foaming material; and a fourth step of performing the third step in case where foam expansion holes are further formed in the permeable reinforcing member besides the fine holes and simultaneously allowing a part of the foaming material to permeate through the inside of the spring assembly in an increased amount through the foam expansion holes of the permeable reinforcing member so as to be convexedly foamed so that an engagement portion between a spring of the spring assembly and the helical coil and/or a seam portion between adjacent springs or a space portion between the springs are embedded into the convexedly foamed part of the foaming material.

In addition, the foaming material is formed integrally with the upper and lower portions of the spring assembly through a fifth step of fixedly disposing the single or multi-layered permeable reinforcing member on the lower surface of the spring assembly, and then performing the second, third and fourth steps in the same manner.

An edge foamer is fittingly attached to the lateral surface of the spring assembly in place of the foaming process of the foaming material performed at the lateral surface of the spring assembly, and then the foaming process is performed at the upper and lower portions of the spring assembly.

To accomplish the above object, according to another aspect of the present invention, there is also provided a bed mattress including a spring assembly having a plurality of springs arranged along row and column directions over the entire area of the bed mattress and a permeable reinforcing member and an intermediate layer disposed on the upper/lower surfaces of the spring assembly, and a cushion material (a foaming material), wherein a mesh-type permeable reinforcing member and an intermediate layer formed in a single-layered or multi-layered sheet shape and formed therein with a plurality of through-holes are interposed between the spring assembly and the cushion material (a foaming material), so that the cushion material formed of a foaming material is foamed so as to cause the foaming material foamed through the through-holes to be expanded convexedly and adhere to the permeable reinforcing member and the spring assembly to be coagulated.

To accomplish the above object, according to another aspect of the present invention, there is also provided a method of manufacturing a bed mattress including a spring assembly consisting of a plurality of springs and a helical coil for securely engaging the springs with one another, the method comprising the steps of: charging a cushion material as a foaming material into a mattress-shaped mold frame; laminating an intermediate layer formed therein with through-holes arranged spaced apart from one another at regular intervals on the cushion material; laminating the mesh-type permeable reinforcing member on the intermediate layer; deposing the spring assembly on the permeable reinforcing member; allowing the foaming of the cushion material (the foaming material) to progress; and allowing the foamed cushion material to be convexedly expanded through the through-holes of the intermediate layer and the permeable reinforcing member to adhere to the spring assembly so as to be coagulated, or the steps of: charging a cushion material as a foaming material into a mattress-shaped mold frame; integrally assembling the spring assembly, a permeable reinforcing member and an intermediate layer with one another to form an assembly, and disposing the assembly on the cushion material (the foaming material); allowing the foaming of the cushion material (the foaming material) to progress; and allowing the foamed cushion material to be convexedly expanded through through-holes of the intermediate layer and the permeable reinforcing member to adhere to the spring assembly so as to be coagulated.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 2a and 2b are cross-sectional views sequentially illustrating the process of manufacturing a bed mattress using a single permeable reinforcing member and a foaming material according to the present invention, in which FIG. 2a shows a state where the foaming material is expandingly foamed at an engagement portion between a spring of the spring assembly and a helical coil, and FIG. 2b shows a state where the foaming material is expandingly foamed at a seam portion between springs or a space portion between the springs;

FIGS. 7a and 7b are cross-sectional views sequentially illustrating the process of manufacturing a bed mattress using a single permeable reinforcing member and a foaming material according to the present invention, in which the structure of the bed mattress is identical to that of FIGS. 2a and 2b, but to which another spring assembly is applied, and wherein FIG. 7a shows a state where the foaming material is expandingly foamed at an engagement portion between a spring of the spring assembly and a helical coil, and FIG. 7b shows a state where the foaming material is expandingly foamed at a seam portion between springs or a space portion between the springs;

DETAILED DESCRIPTION OF THE PREFERRED EMBODIMENT

Figure 1:
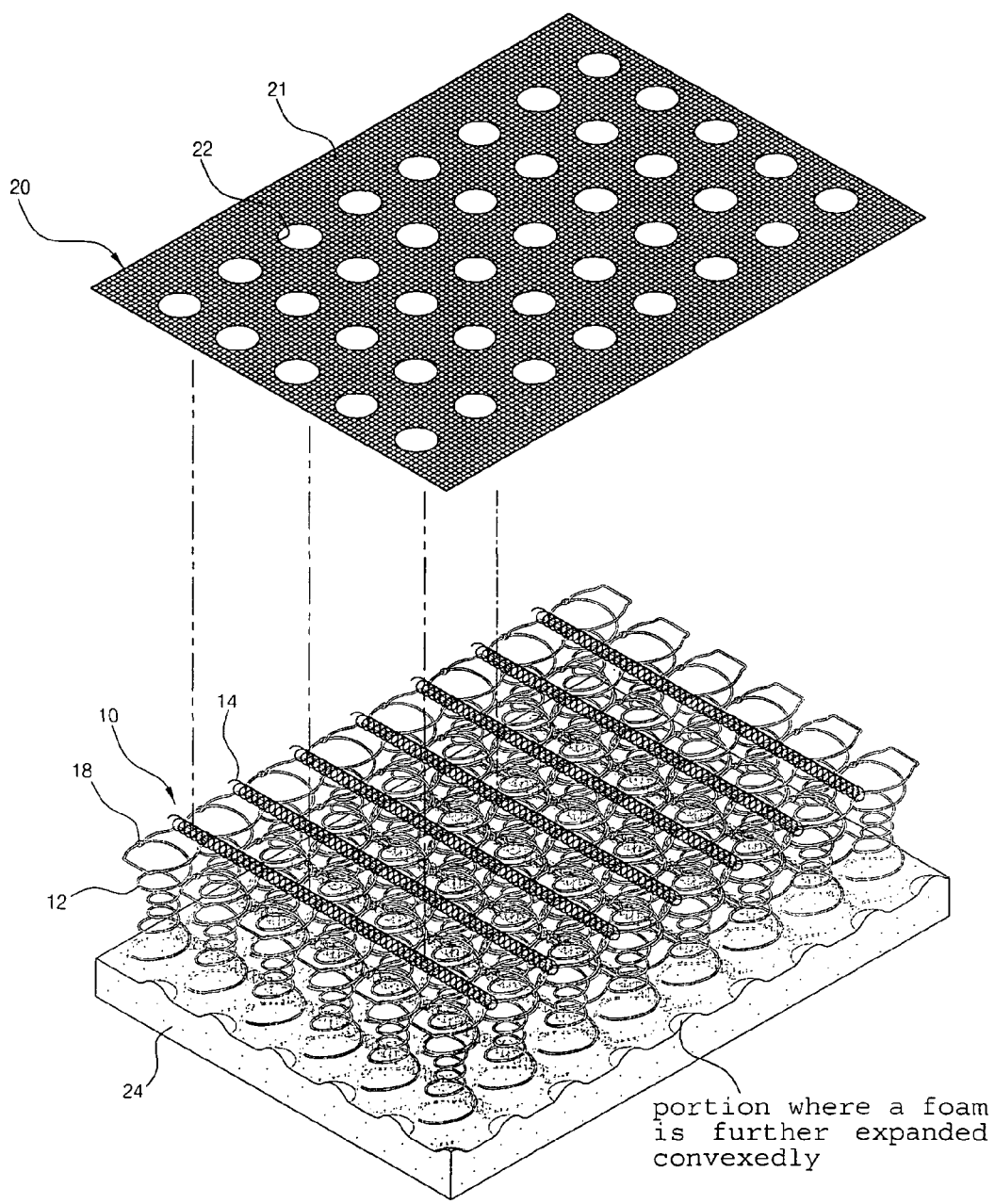
FIG. 1 is a perspective view illustrating the structure of a bed mattress using a permeable reinforcing member and a foaming material according to the present invention, in which a lower portion of the bed mattress structure represents a state after the foaming is completed, and an upper portion thereof represents a state before the foaming is completed.

Reference will now be made in detail to the preferred embodiment of the present invention with reference to the attached drawings.

The attached FIGS. 1 to 5 and FIGS. 6 to 10 show the same foaming structure, but different spring assemblies. In the drawings, the spring assembly is merely an illustrative example for explaining the foaming structure and the manufacturing process of the present invention. It is natural that various types of spring assemblies should be applied to the bed mattress according to the present invention so as to implement the foaming process.

Figure 2A:
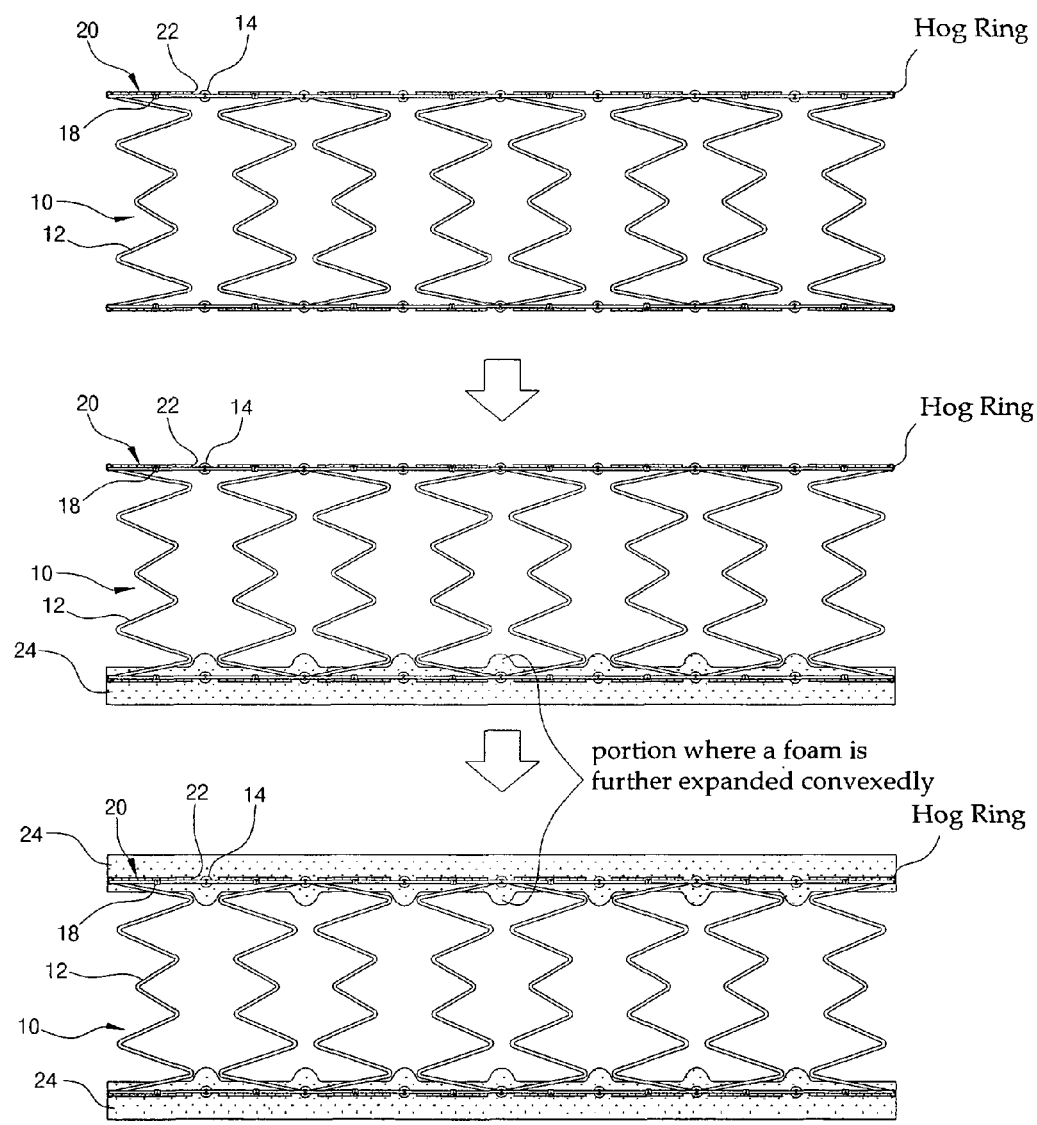
Figure 2B:
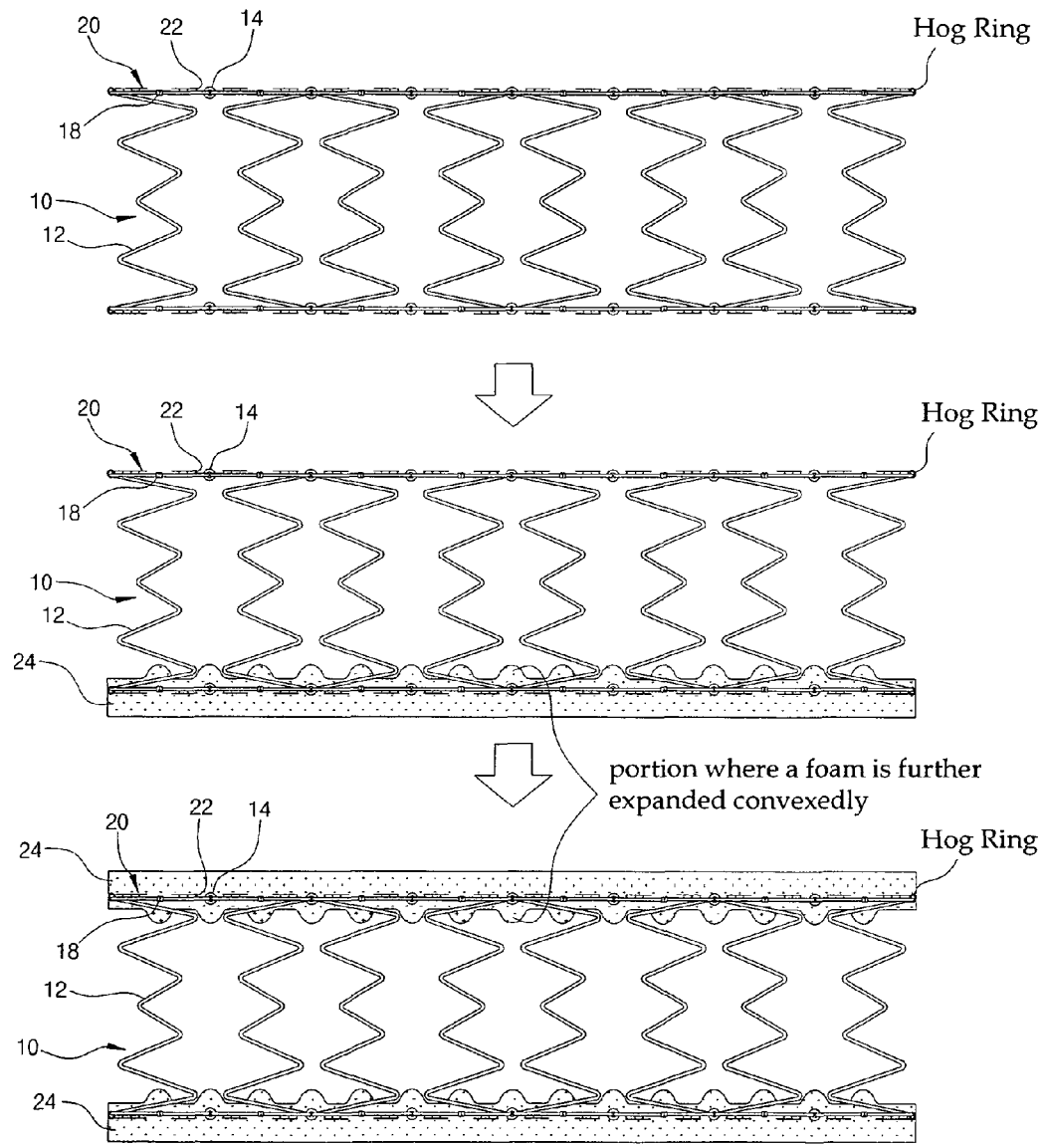
Figure 3:
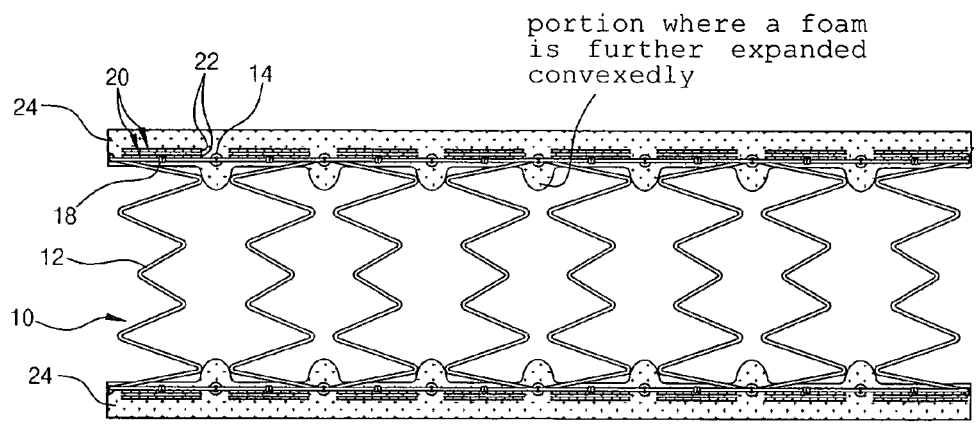
FIG. 3 is a cross-sectional view illustrating the structure of a bed mattress using a multi-layered (at least two layers) permeable reinforcing member and a foaming material according to the present invention.
Figure 6:
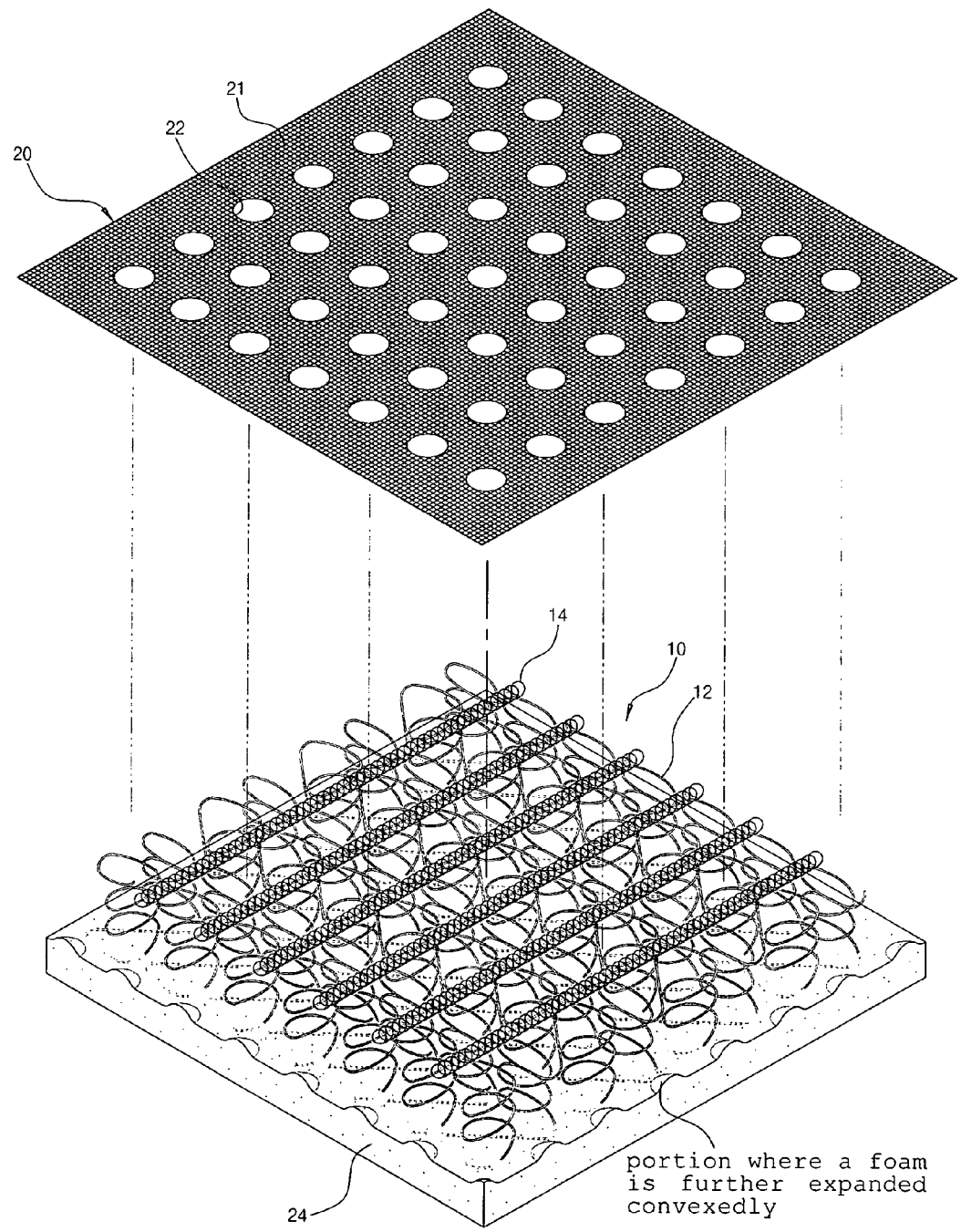
FIG. 6 is a perspective view illustrating the structure of a bed mattress using a permeable reinforcing member and a foaming material according to the present invention, which is identical to the structure of FIG. 1, but to which another spring assembly is applied.
Figure 7A:
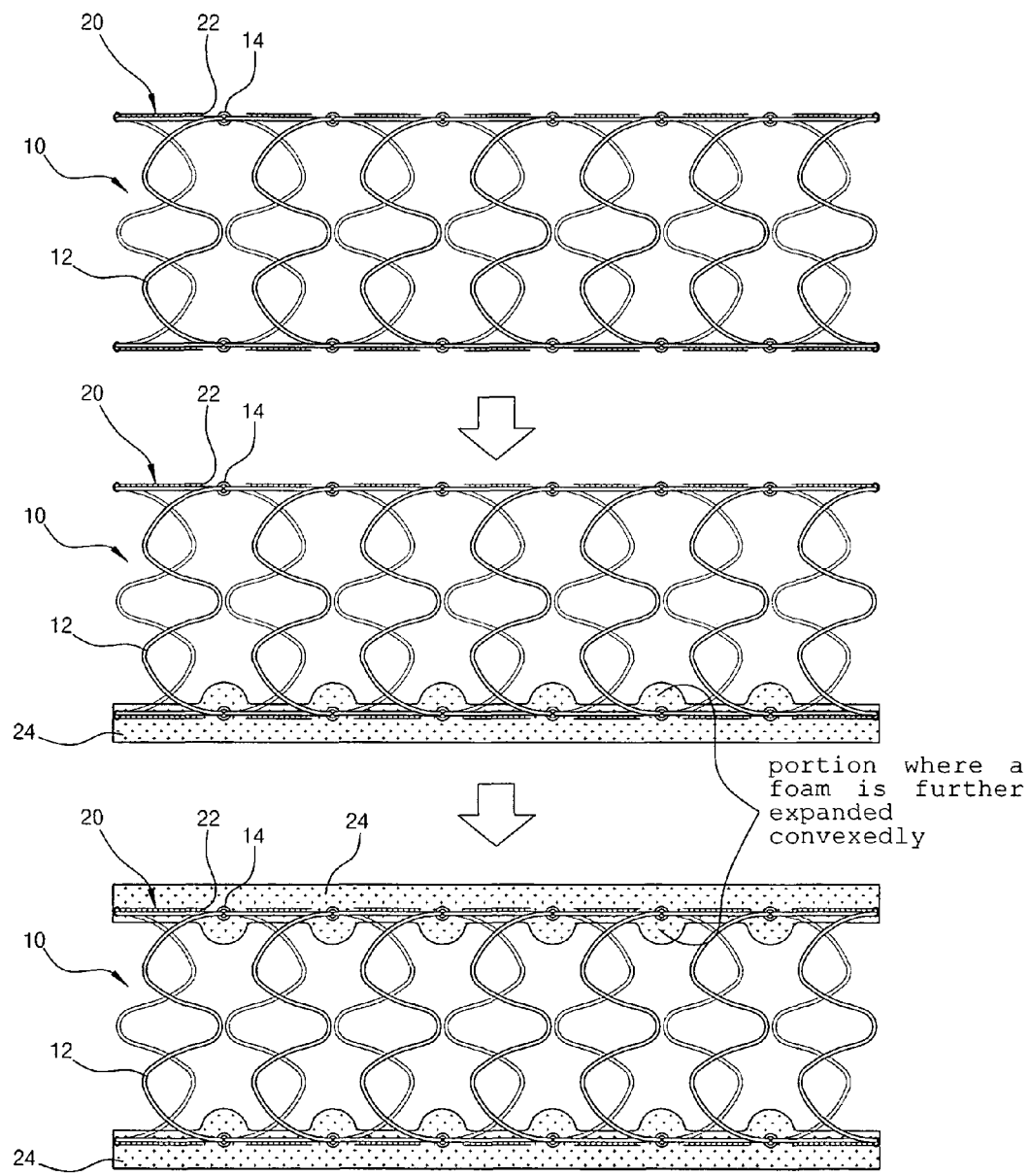
Figure 7B:
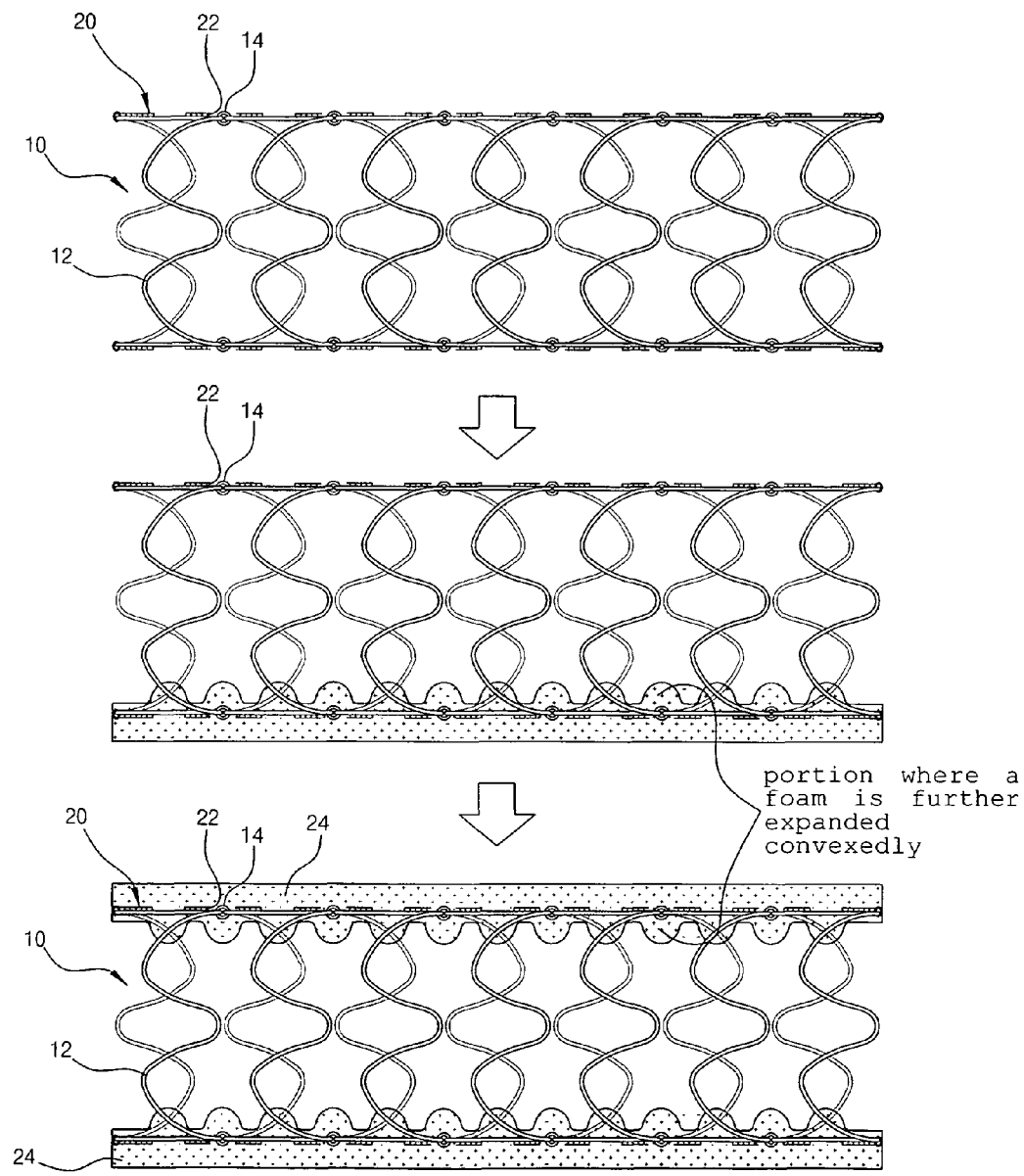
Figure 8:
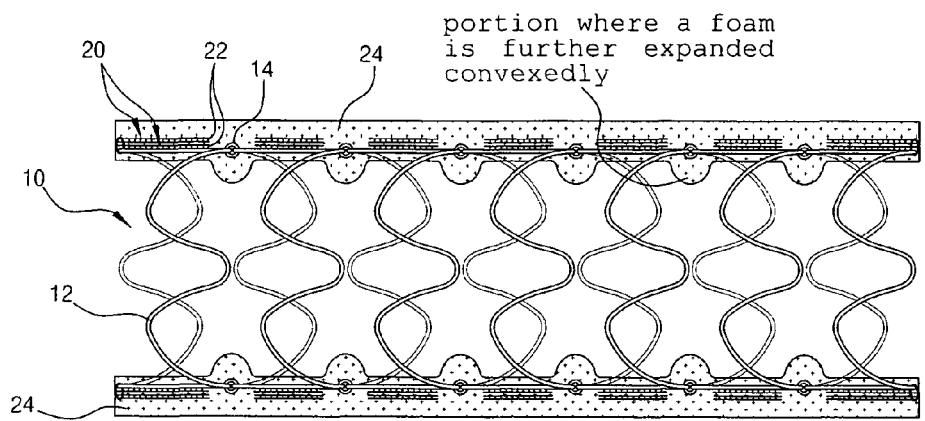
FIG. 8 is a cross-sectional view illustrating the structure of a bed mattress using a multi-layered (at least two layers) permeable reinforcing member and a foaming material according to the present invention, which is identical to the structure of FIG. 3, but to which another spring assembly is applied.

FIGS. 1 and 6 are perspective views illustrating the structure of a bed mattress using a permeable reinforcing member and a foaming material according to the present invention, in which a lower portion of the bed mattress structure represents a state after the foaming is completed, and an upper portion thereof represents a state before the foaming is completed, FIGS. 2a, 2b, 7a and 7b are cross-sectional views sequentially illustrating the process of manufacturing a bed mattress using a single permeable reinforcing member and a foaming material according to the present invention, and FIGS. 3 and 8 are cross-sectional views illustrating the structure of a bed mattress using a multi-layered (at least two layers) permeable reinforcing member and a foaming material according to the present invention.

The present invention is intended to provide a bed mattress having an excellent durability even through a simple process of integrally forming the foaming material with the spring assembly at the upper and lower surfaces of the spring assembly by means of a permeable reinforcing member. Particularly, the present invention allows the foaming of a foaming material to progress toward the spring assembly through fine holes and/or foam expansion holes formed on the permeable reinforcing member, to thereby provide an excellent bonding force between the spring assembly and the foaming material and prevent the generation of a noise due to the contact between the springs of the spring assembly.

As mentioned above, the spring assembly 10 for a bed mattress includes a plurality of springs 12 arranged along row and column directions over the substantially same area as that of the bed mattress, and a helical coil as a means for securely engaging adjacent respective springs 12 with one another.

More specifically, the upper and lower ends of the spring 12 are connected together with those of adjacent spring 12, and a connection portion between the springs 12 is called a seam portion 18.

A single or multi-layered (at least two layers) permeable reinforcing member 20 is disposed on the upper and/or lower surfaces/surface of the spring assembly 10 formed in the above structure and then is fixed to the spring assembly 10 by means of Hog Ring in which an air gun shoots a circular loop-shaped piece toward a to-be-fixed-object for fixing it. Besides this Hog Ring, other various methods such as a method of attaching the permeable reinforcing member to the spring assembly with an adhesive may be used.

The permeable reinforcing member 20 is a mesh-type structure penetratingly formed thereon with a plurality of fine holes 21 arranged along row and column directions, and is embedded into a foaming material 24 along with the partial upper of the spring assembly so as to serve as a frame, which will be described later.

The permeable reinforcing member 20 may be embodied in the form of a single or double layered structure in view of the thickness of the foaming material 24. Of course it should be appreciated that the permeable reinforcing member 20 may be constituted by more than two layers, if necessary.

Particularly, the permeable reinforcing member 20 may be further penetratingly formed thereon with a plurality of circular-shaped foam expansion holes 22 arranged along row and column directions in such a fashion as to be spaced apart from one another at regular intervals. For example, a predetermined area of the permeable reinforcing member 20 formed thereon with fine holes 21 along row and column directions is cut in a circular shape at a time and is penetratingly formed thereon with the foam expansion holes 22.

Accordingly, when a foaming material 24 is disposed on the outer surface of the permeable reinforcing member 20 to cause the foaming of the foaming material to progress, the permeable reinforcing member 20 is embedded into the foamed foaming material 24 so as to act as a frame, and simultaneously the upper and lower ends of the springs 10 and the helical coil 14 for securely engaging the springs with one another are also embedded into the foaming material 24.

Concurrently, the foaming of the foaming material 24 progresses toward the spring assembly 10 through the foam expansion holes 22 of the permeable reinforcing member 20 in such a fashion as to be further expanded convexedly.

Figure 4:
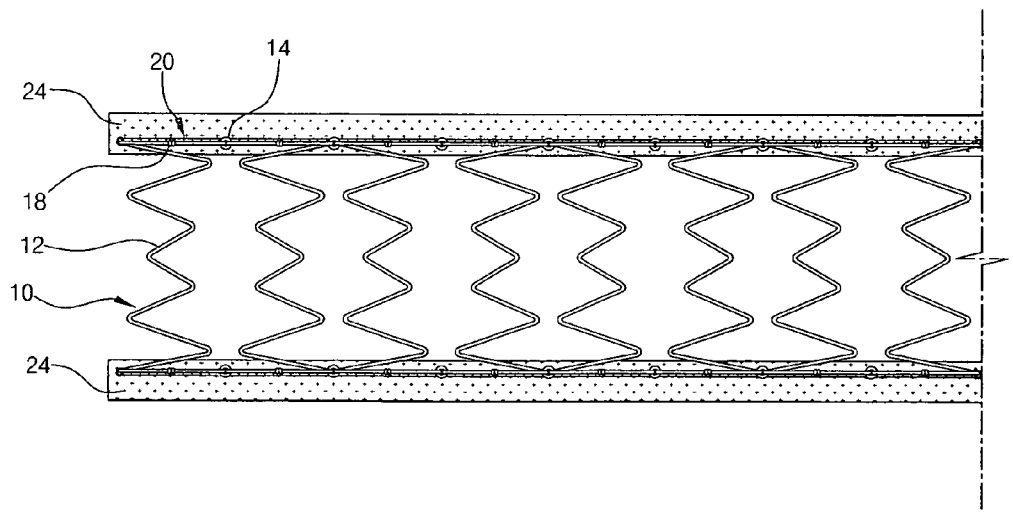
FIG. 4 is a cross-sectional view illustrating the structure of a bed mattress using a permeable reinforcing member and a foaming material according to the present invention, in which fine holes are formed, but foam expansion holes are not formed on the permeable reinforcing member.
Figure 9:
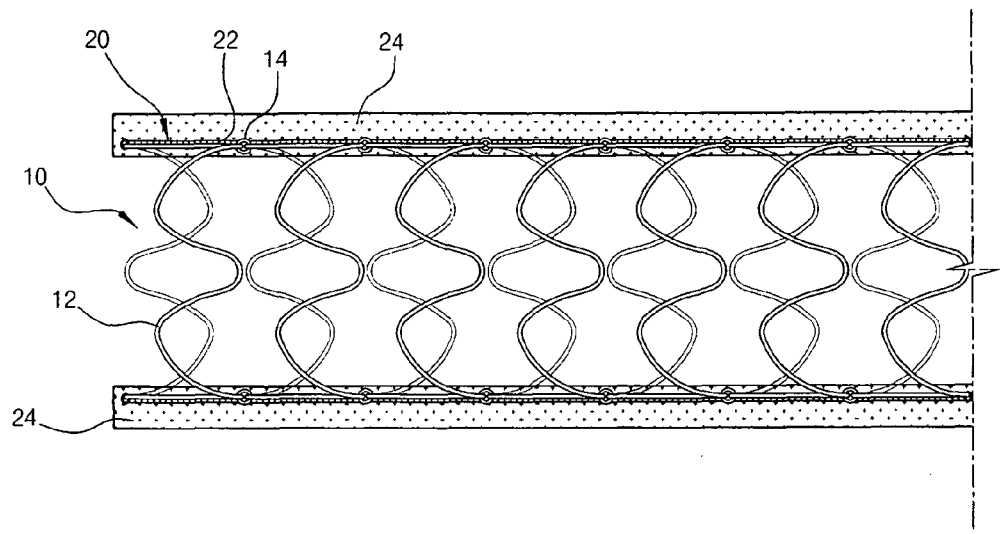
FIG. 9 is a cross-sectional view illustrating the structure of a bed mattress using a permeable reinforcing member and a foaming material according to the present invention, in which fine holes are formed, but foam expansion holes are not formed on the permeable reinforcing member, which is identical to the structure of FIG. 4, but to which another spring assembly is applied.

In the meantime, as shown in FIGS. 4 and 9, even in case of using the permeable reinforcing member 20 formed with only the fine holes 21, but not formed with the foam expansion holes 22, the foaming of the foaming material 24 on the upper and lower portions of the spring assembly is possible. In this case, since the foaming of the foaming material progresses through the fine holes 21 only, the height of the foaming material 24 passing through the fine holes 21 is maintained evenly, but the thickness of the foaming material 24 being foamed is not sufficient relatively.

At this time, the permeable reinforcing member 20 preferably employs any one of a fine mesh and a non-woven fabric. In the case where the permeable reinforcing member 20 is the fine mesh, each fine hole preferably has a size of 1~30 mm×1~30 mm. The reason for this is that if the fine hole has a size of less than 1 mm×1 mm, the foaming material 24 is not normally permeated through the fine hole during the foaming thereof whereas if the fine hole has a size of more than 30 mm×30 mm, the foaming material 24 is very excessively permeated through the fine hole.

In addition, each foam expansion hole 22 of the permeable reinforcing member 20 preferably has a diameter of 3 mm to 80 mm. The reason for this is that the foam expansion hole 22 has a diameter of less than 3 mm, the area of the foaming material 24 passing through the foam expansion hole 22 is small but the height of the foaming material 24 being foamed is increased whereas if the foam expansion hole 22 has a diameter of more than 80 mm, the area of the foaming material 24 passing through the foam expansion hole 22 is large but the height of the foaming material 24 is decreased and at which time the foaming material is spread out laterally.

Particularly, more preferably, the diameter of the foam expansion hole 22 of the permeable reinforcing material is within a range between 25 mm and 35 mm.

of course, the foam expansion hole 22 is made larger than the fine hole 21. For example, if the fine hole 21 has a size of 1 mm×1 mm, the diameter of the foam expansion hole 22 is selectively applied within a range between 2 mm and 80 mm in view of the application thickness of the foaming material 24. In the meantime, if the fine hole 21 has a size of 10 mm×10 mm, the diameter of the foam expansion hole 22 is selectively applied within a range between 11 mm and 80 mm in view of the application thickness of the foaming material 24. Also, if the fine hole 21 has a size of 30 mm×30 mm, the diameter of the foam expansion hole 22 is selectively applied within a range between 31 mm and 80 mm in view of the application thickness of the foaming material 24.

This is merely an illustrative example, and the foam expansion hole 22 is set to be larger in size than the fine hole 21 in such a fashion that the size of the fine hole 21 and the foam expansion hole 22 is selectively applied in view of the application thickness of the foaming material 24.

Particularly, the foam expansion hole 22 is preferably penetratingly formed on the permeable reinforcing member 20 in such a fashion as to be arranged at a position corresponding to the engagement portion between each spring 12 of the spring assembly 10 and the helical coil 14. More preferably, the foam expansion hole 22 is further penetratingly formed on the permeable reinforcing member 20 in such a fashion as to be arranged at a position corresponding to the seam portion 18 between springs 12 of the spring assembly 10 or the space portion between the springs 12.

The reason for this is that the foaming of the foaming material 24 progresses toward the engagement portion between each spring 12 and the helical coil 14, and the seam portion 18 between the springs 12 adjacent to each other, and the space portion between the adjacent springs 12 through the foam expansion holes 22 of the permeable reinforcing member 20 in such a fashion as to be further expanded convexedly, to thereby enhance the bonding force between the spring assembly 10 and the foaming material 24 at the engagement portion between each spring 12 and the helical coil 14, and the seam portion 18 between the springs 12 adjacent to each other, and the space portion between the adjacent springs 12.

Accordingly, as shown in FIG. 2a, the expandable foaming is carried out at the helical coil 14 of the spring assembly 10. As shown in FIG. 2b, the expandable foaming may also be performed at the seam portion 18 between the adjacent springs, and the space portion between the adjacent springs besides the helical coil 14 of the spring assembly 10.

Now, a method of manufacturing a bed mattress using a foaming material according to the present invention will be described hereinafter in detail with reference to FIGS. 2a, 2b, 7a and 7b.

First, the bed mattress includes a spring assembly 10 consisting of a plurality of springs 12 arranged along row and column directions over the entire area thereof in such a fashion as to be spaced apart from one another at regular intervals, and a helical coil 14 for securely engaging adjacent springs 12 with one another.

Subsequently, a single or multi-layered (at least two layers) permeable reinforcing member 20 is disposed on the upper surface of the spring assembly 10 and is fixed by using Hog Ring in which an air gun shoots a circular loop-shaped piece toward a to-be-fixed-object for fixing it.

Of course, besides the above Hog Ring, various methods may be used which includes a method of attaching the permeable reinforcing member 20 on the upper surface of the spring assembly 10 using an adhesive.

Next, as the foaming process of the foaming material 24 progresses over the outer surface of the permeable reinforcing member 20, the foaming material 24 is foamed toward the inside of the spring assembly 10 through the fine holes 21 so that the permeable reinforcing member 20 is embedded into the foaming material 24 being foamed to serve as a frame and simultaneously the upper end of the spring 12 is embedded into the foaming material 24 to thereby cause the foaming material 24 and the spring 12 of the spring assembly to be formed integrally with each other.

Further, in the case where the permeable reinforcing member 20 is further formed thereon with foam expansion holes 22 besides the fine holes, a part of the foaming material is permeated through the inside of the spring assembly in an increased amount through the foam expansion holes 22 of the permeable reinforcing member 20 so as to be convexedly expandably foamed.

Accordingly, an engagement portion between the springs 12 of the spring assembly 10 and the helical coil 14 securely engaging the springs 12, and a seam portion between the springs 12 or a space portion between the springs 12 are embedded into the foaming material foamed convexedly toward the inside of the spring assembly 10 to thereby further enhance the bonding force between the spring assembly 10 and the foaming material 24 at the engagement portion between each spring 12 and the helical coil 14, and the seam portion 18 between the springs 12, and the space portion between the adjacent springs 12.

Similarly, a single or multi-layered (at least two layers) permeable reinforcing member 20 is fixedly disposed on the lower surface of the spring assembly 10, and then the foaming material 24 is subjected to the same foaming process as the above foaming process, so that the foaming material 24 is formed integrally with the lower portion of the spring assembly 10. Thus, as shown in the last figures of FIGS. 2a, 2b, 7a and 7b, a bed mattress product is manufactured in which the foaming material 24 is formed integrally with the upper and lower portions of the spring assembly 10.

As an alternative embodiment, the foaming material 24 may be foamed on any one of the upper surface and lower surface of the spring assembly 10 according to the circumstances.

In the meantime, referring to FIG. 7b, the foaming material is also expandingly foamed at the seam portion between springs or the space portion between the springs 12 besides the engagement portion between the springs 12 and the helical coil 14, to thereby further enhance the bonding force between the spring assembly 10 and the foaming material 24.

Now, besides the foaming process performed at the upper and lower portions of the spring assembly, the foaming process at a lateral surface of the spring assembly will be described hereinafter.

Figure 4A:
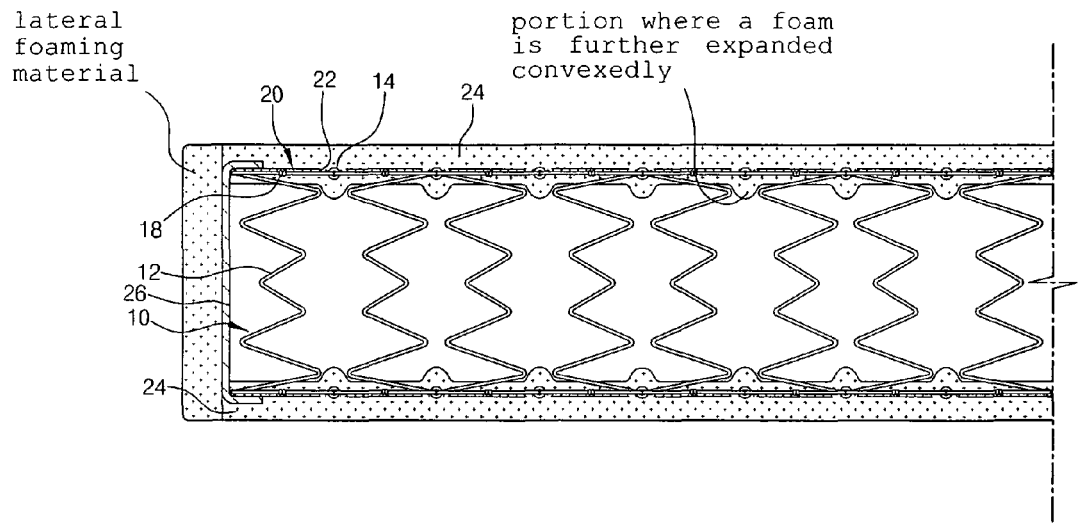
FIG. 4a is a cross-sectional view illustrating the structure of a bed mattress using a permeable reinforcing member and a foaming material according to the present invention, in which the foaming is further performed at a lateral surface besides the foaming performed at the upper and lower portions of the spring assembly.
Figure 8A:
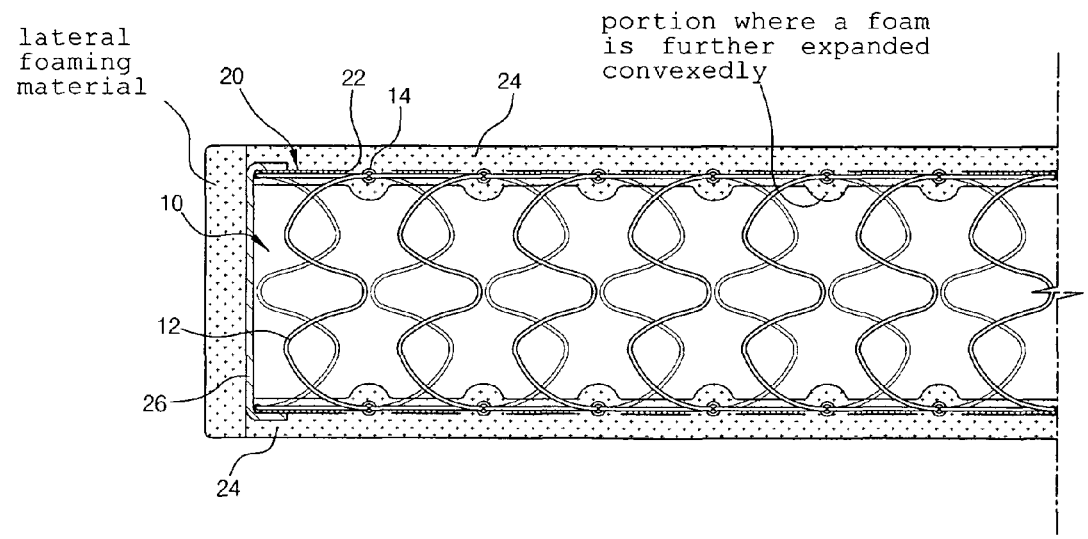
FIG. 8a is a cross-sectional view illustrating the structure of a bed mattress using a permeable reinforcing member and a foaming material according to the present invention, in which the foaming is further performed at a lateral surface besides the foaming performed at the upper and lower portions of the spring assembly, which is identical to the structure of FIG. 4a, but to which another spring assembly is applied.

FIGS. 4a and 8a are cross-sectional views illustrating the structure of a bed mattress using a permeable reinforcing member and a foaming material according to the present invention, in which the foaming is further performed at a lateral surface of the spring assembly besides the foaming performed at the upper and lower portions of the spring assembly.

To describe the foaming process at the lateral surface of the spring assembly, first a non-woven fabric 26 is attached along the lateral surface of the spring assembly 10 and then is fixed to the spring assembly by means of Hog Ring prior to the progress of the foaming process at the upper and lower portions of the spring assembly 10.

Subsequently, the foaming process progresses at the upper and lower portions of the spring assembly 10 as described above, and then the lateral foaming process is performed.

That is, the spring assembly 10 fixed with the non-woven fabric at the lateral surface is put into a mold (not shown) of the foaming apparatus and the foaming material 24 is injected along the lateral surface of the spring assembly 10. Then, when the spring assembly 10 is removed from the mold after the completion of the foaming of foaming material 24, a lateral foaming process is finished in which the foaming material 24 is further formed integrally with the lateral surface of the spring assembly 10.

Figure 5:
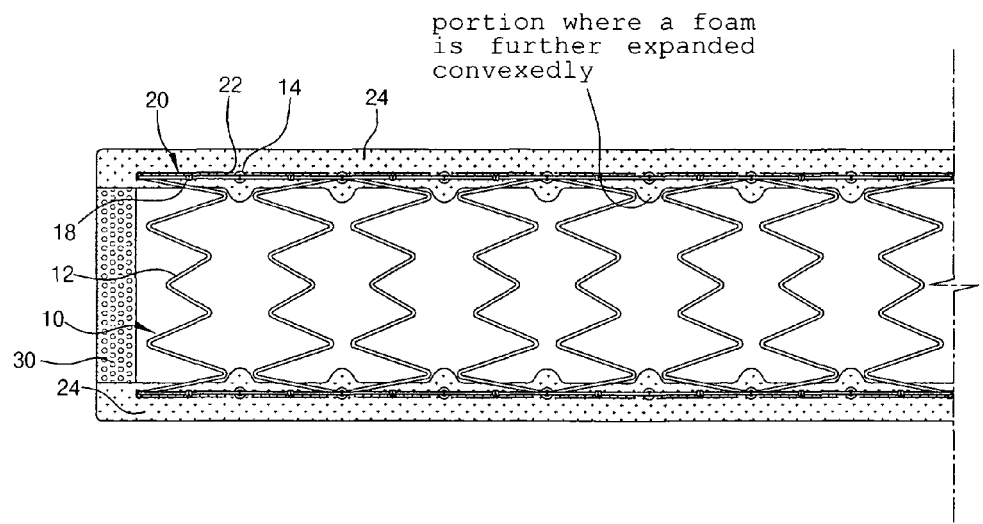
FIG. 5 is a cross-sectional view illustrating the structure of a bed mattress using a permeable reinforcing member and a foaming material according to the present invention, in which an edge foamer is fittingly attached to the lateral surface of the spring assembly, but a separate lateral foaming is not performed along the lateral surface of the spring assembly besides the foaming performed at the upper and lower portions of the spring assembly.
Figure 10:
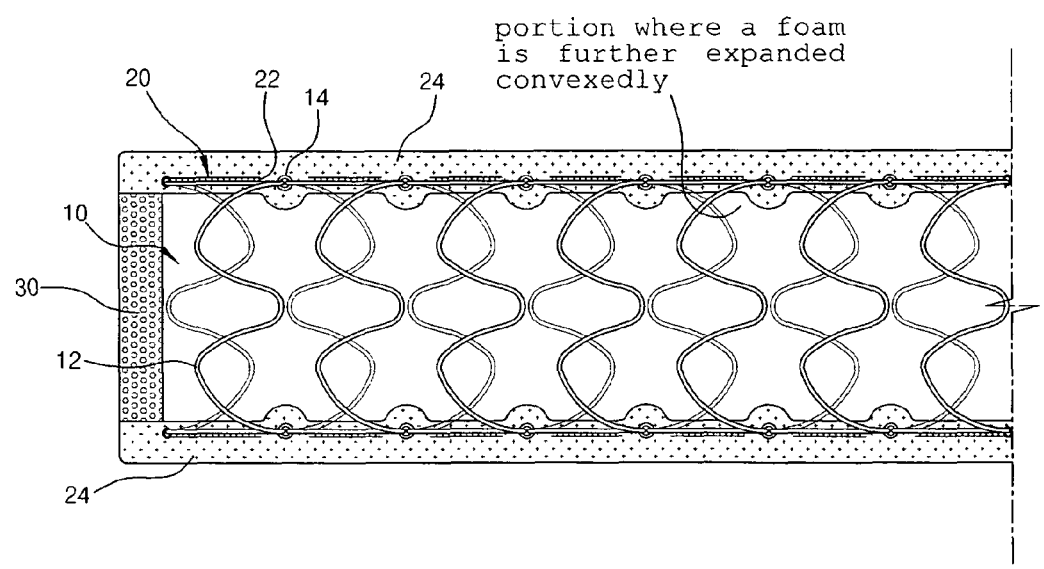
FIG. 10 is a cross-sectional view illustrating the structure of a bed mattress using a permeable reinforcing member and a foaming material according to the present invention, in which an edge foamer is fittingly attached to the lateral surface of the spring assembly, but a separate lateral foaming is not performed along the lateral surface of the spring assembly besides the foaming performed at the upper and lower portions of the spring assembly, which is identical to the structure of FIG. 5, but to which another spring assembly is applied.

In addition, as shown in FIGS. 5 and 10, an edge foamer 30 is fittingly attached to the lateral surface of the spring assembly, without performing a separate lateral foaming for the spring assembly 10 and then the foaming may be performed at the upper and lower portions of the spring assembly 10.

Another embodiment of the present invention will be described hereinafter.

Figure 11A:
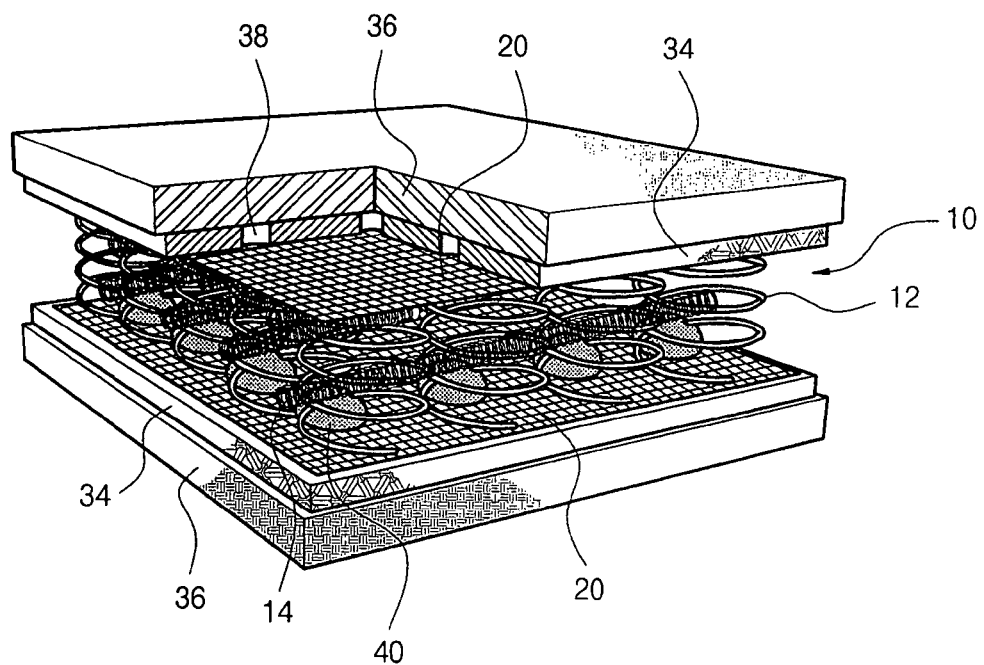
FIGS. 11a and 11b are simulation views illustrating the structure of a bed mattress manufactured by using an intermediate layer having a plurality of through-holes formed therein, a mesh-type permeable reinforcing member, and a cushion material as a foaming material according to another embodiment of the present invention.
Figure 11B:
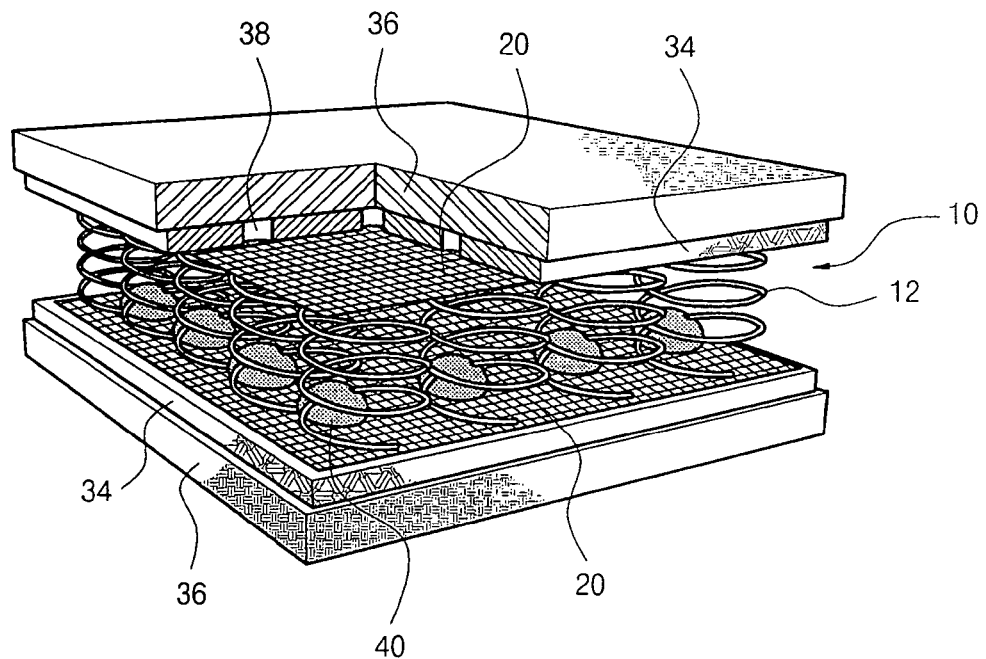
Figure 12A:
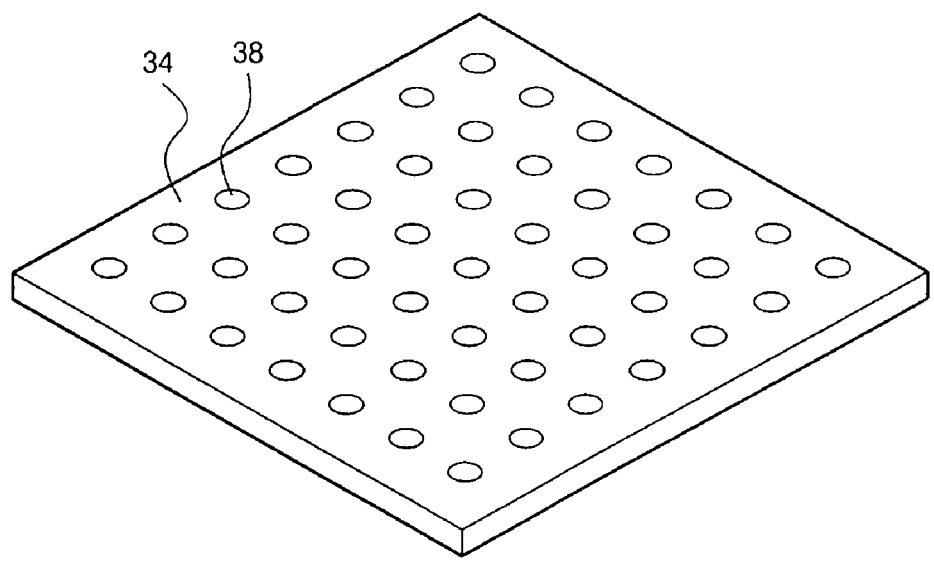
FIGS. 12a and 12b are perspective views illustrating the structure of the intermediate layer applied to the bed mattress of FIGS. 11a and 11b.
Figure 12B:
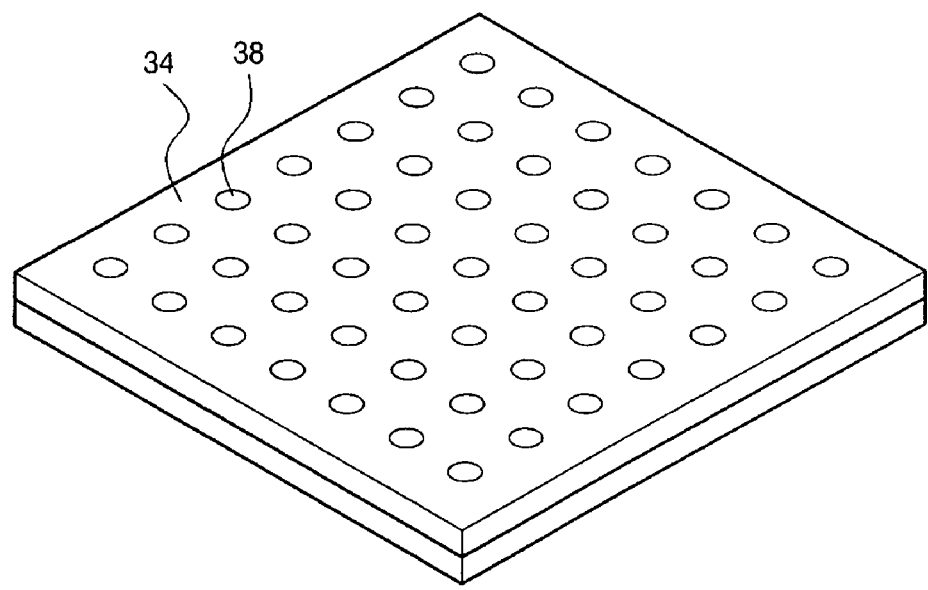
Figure 13A:
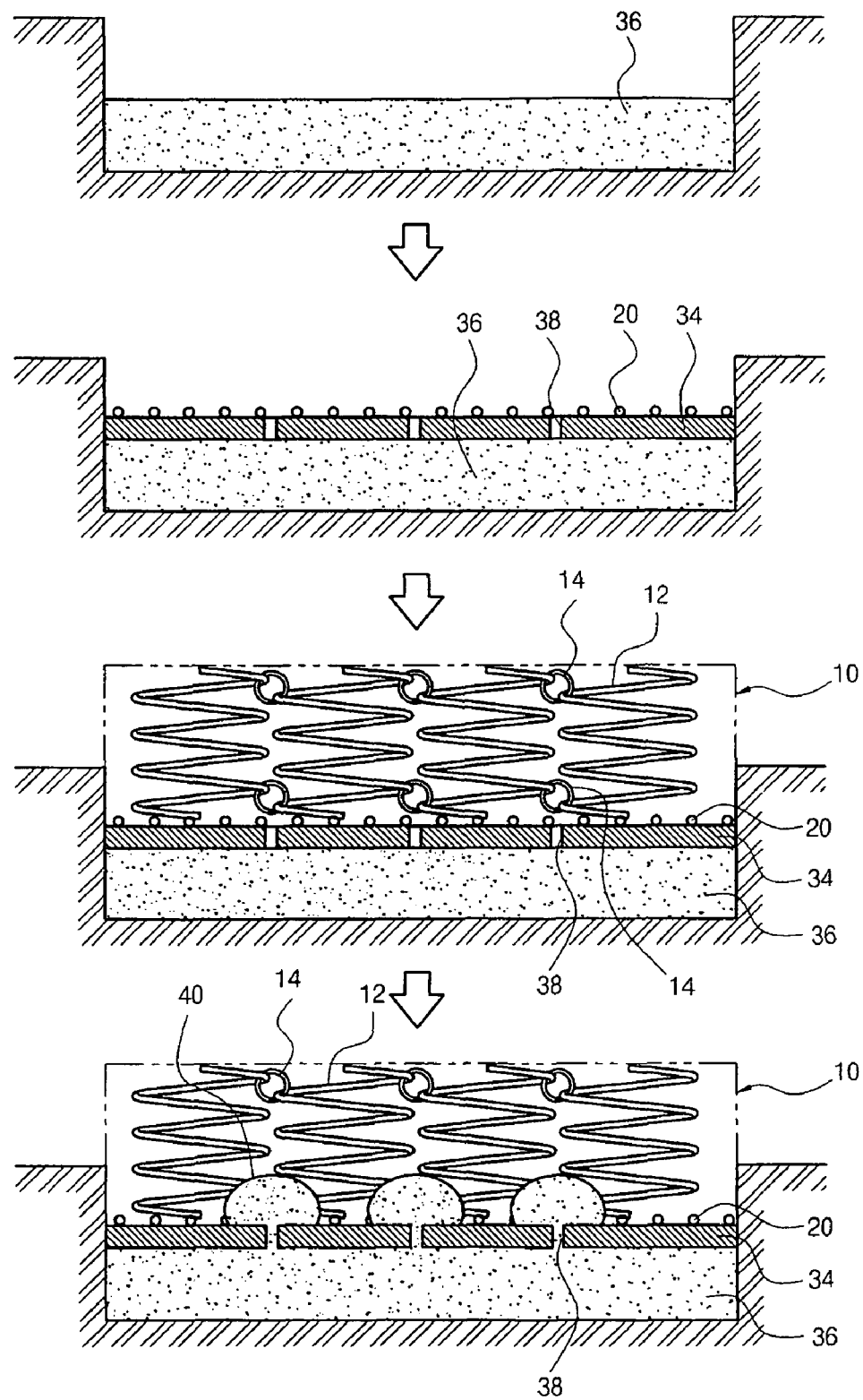
FIGS. 13a and 13b are cross-sectional views sequentially illustrating the process of manufacturing the bed mattress of FIGS. 11a and 11b.
Figure 13B:
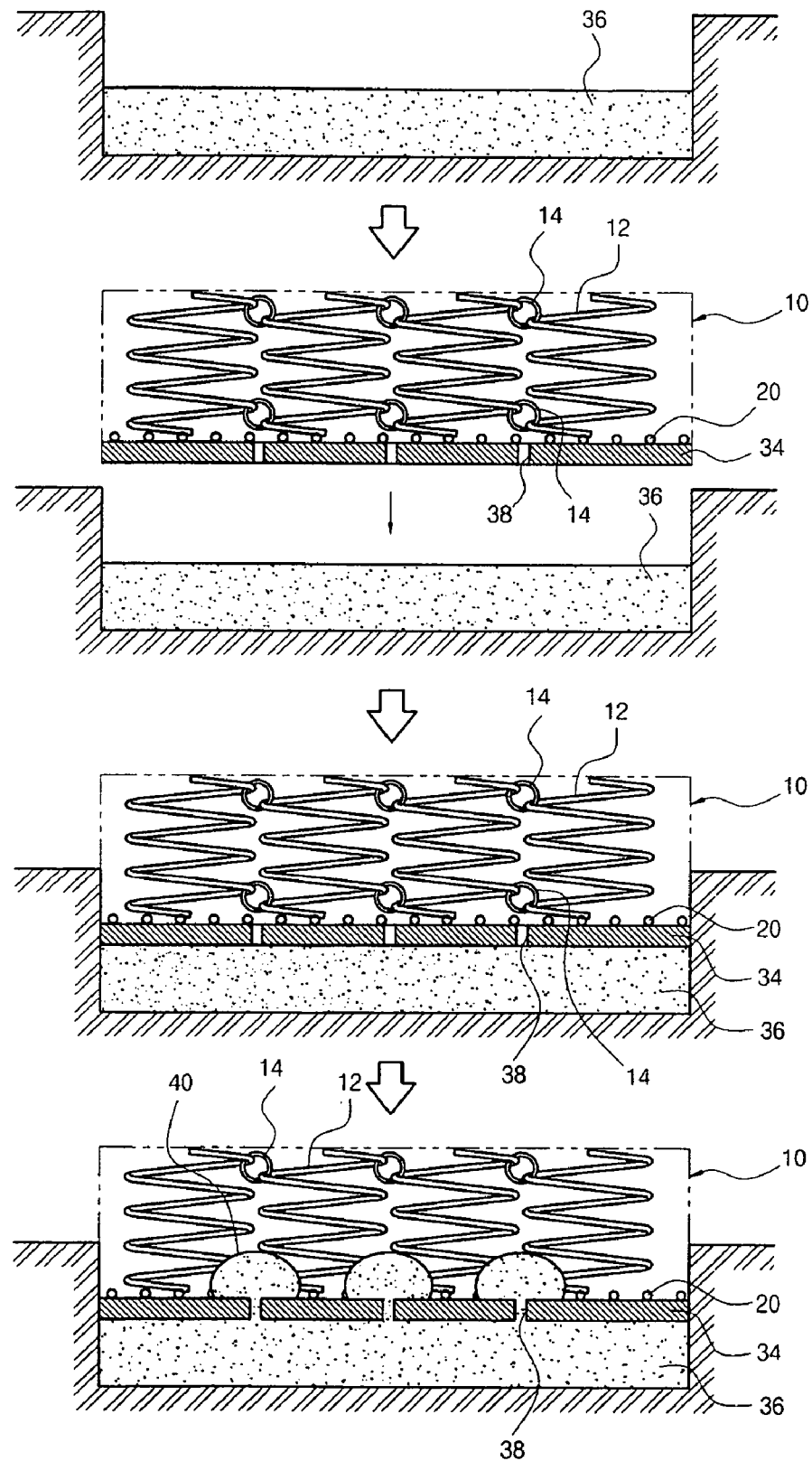
Figure 14:
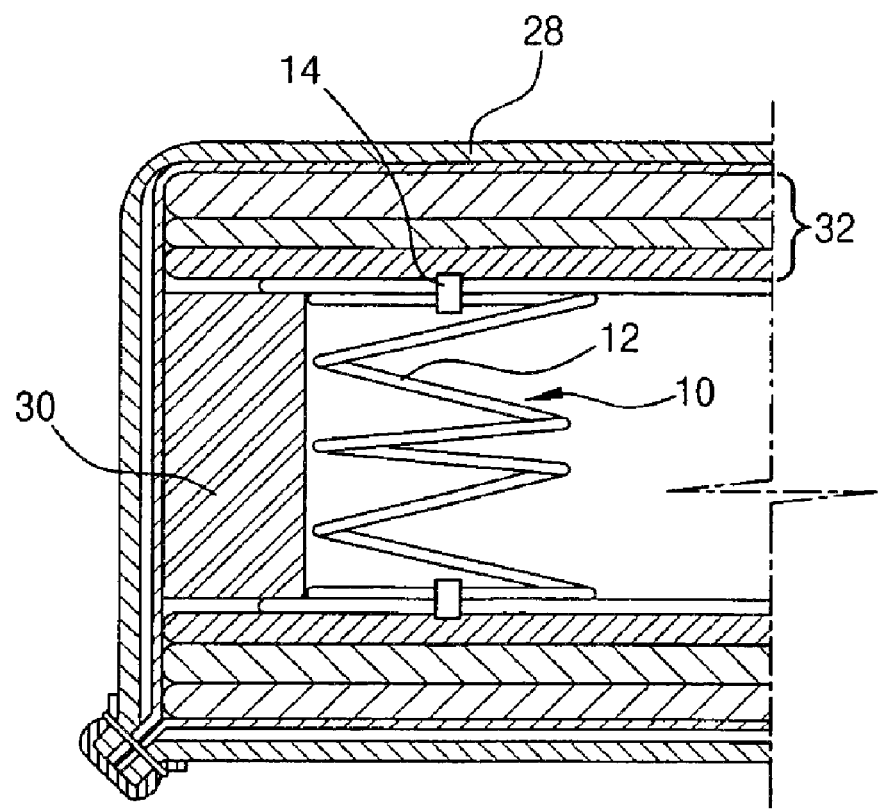
FIG. 14 is a cross-section view illustrating the structure of a conventional bed mattress.

FIGS. 11a and 11b are simulation views illustrating the structure of a bed mattress manufactured by using a mesh-type permeable reinforcing member, an intermediate layer having a plurality of through-holes formed therein and a foaming material as a cushion material according to the present invention, in which FIG. 11a shows a state where helical coils are engaged with the springs, and FIG. 11b shows a state where helical coils are not engaged with the springs, FIGS. 12a and 12b are perspective views illustrating the structure of the intermediate layer applied to the bed mattress of FIGS. 11a and 11b, in which FIG. 12a shows a single-layered structure of the intermediate layer and FIG. 12b shows a multi-layered structure of the intermediate layer, and FIGS. 13a and 13b are cross-sectional views sequentially illustrating the process of manufacturing the bed mattress of FIGS. 11a and 11b.

As shown in FIGS. 11a and 11b, the structure of the bed mattress of the present invention employs a foaming material as a cushion material 36 and is configured such that a convexo-foamed mass 40 formed by foaming the foaming material is securely engaged with the spring assembly 10 through the through-holes of the intermediate layer. As shown in FIGS. 11a and 11b, the bed mattress includes a spring assembly 10 having springs 12 arranged along row and column directions over the entire area of the bed mattress, in which the springs 12 are securely fixed or not fixed to each other by a helical coil 14, a mesh-type permeable reinforcing member 20 disposed over the upper and lower surfaces of the spring assembly 10, an intermediate layer 34 laminated on the upper and lower surfaces of the permeable reinforcing member, which is formed in a single-layered or multi-layered sheet shape, and a cushion material as a foaming material formed on the upper and lower surfaces of the intermediate layer.

The cushion material 36, which is a polyurethane foam, is intended to be foamed while being cured. Thus, in case where two liquids, i.e., a polyether polyol and a polyfunctional isocyanate are mixed with each other, they are cured while being subjected to a crosslinking reaction where the two liquids are bonded to each other. Particularly, an example of the foaming material may include a foaming material such as polyethylene, etc., besides polyurethane. Also, all of the foaming materials made of a soft material, especially, a memory foam may be taken as an example of the foaming material.

The intermediate layer 36 is formed in a single-layered or multi-layered sheet shape which is made of various interior materials such as felts, non-woven fabrics, palms or the like and has a uniform thickness. The intermediate layer 356 is formed therein with a plurality of through-holes 38 arranged spaced apart from one another at regular intervals along row and column directions.

The through-holes 34 serves as passageways for the expansion of the foaming material, through which a foam of a foaming material passes and then adheres to respective springs 12 or helical coils 14 of the spring assembly 10 so as to be coagulated.

At this time, the through-holes 38 are formed over the entire area of the bed mattress. The reason for this is that the even distribution of the foamed mass 40 is induced to thereby establish a stronger bonding between the spring assembly 10 and the cushion material 36 (the foaming material).

In particular, the foamed mass 40 of the cushion material 36 (the foaming material) permeates through the through-holes 38 of the intermediate layer 34 and then adheres to respective springs 12 or helical coils 14 of the spring assembly 10 so as to be coagulated, so that a crack is prevented from being generated due to a fatigue load accumulated at the springs and helical coils to thereby prolong the lifespan of the interior materials of the mattress and the mattress itself as well as reduce a noise of the spring itself.

As shown in FIGS. 12a and 12b, the through-holes 38 formed in the intermediate layer 34 are arranged such that they are formed along row and column directions over the intermediate layer 34 in such a fashion as to be continuously equidistantly spaced apart from one another.

In this case, the through-holes 38 are formed in a shape for allowing easy escape of the foamed mass 40. The through-holes 38 may have any shape and arrangement which enhances the bonding strength between the spring assembly 10 and the cushion material 36 (the foaming material).

In the meantime, the permeable reinforcing member 20 is formed in the shape of a mesh-type string with uniform intervals, so that the foamed mass 40 adhere to the mesh-type string to increase fixibility or immobility of the bed mattress structure, thereby improving the bonding performance of the spring assembly 10 and the cushion material 36 (the foaming material) as well as attaining even distribution and buffering of a load of a sleeper.

The permeable reinforcing member 20 is designed such that it is laminated between the intermediate layer 34 and the spring assembly 10 upon the manufacturing process of the bed mattress.

The bed mattress as constructed above is configured such that a foaming material used as the cushion material 36 is expandably foamed through the through-holes 38 formed inside the intermediate layer 34 and simultaneously is coagulated to cause the spring assembly 10 and the cushion material 36 (the foaming material) to be strongly bonded to each other.

Now, the assembling process of the bed mattress according to the present invention will be described hereinafter with reference to FIG. 13a showing an assembling process chart.

First, a foaming material as a cushion material 36 is charged into a mattress-shaped lower mold frame, and the intermediate layer 34 formed with the through-holes 38 arranged spaced apart from one another at regular intervals and the permeable reinforcing member 20 are sequentially laminated on the cushion material (the foaming material).

At this time, since the foaming material is slowly foamed, the laminated structure (i.e., the intermediate layer, the mesh-type permeable reinforcing member and the spring assembly) are preferably laminated rapidly before the foaming material is completely foamed.

The foaming material continues to be foamed even while a predetermined time period (about 15 minutes) lapses at a state where the spring assembly 10 is laminated on the permeable reinforcing member 20. The foamed mass 40 is expanded convexedly through the through-holes 38 of the intermediate layer 34 so as to adhere to the spring assembly 10.

In this case, the spring assembly 10, the permeable reinforcing member 20 and the intermediate layer 34 are separately laminated on the cushion material 36 (the foaming material) in FIG. 13a. Alternatively, the permeable reinforcing member 20 and the intermediate layer 34 are strongly assembled integrally with the lower end of the spring assembly 10 to form an assembly and the assembly is laminated on the cushion material (36: the foaming material) in FIG. 13b.

In the meantime, it is preferable to cover an upper mold frame onto the lower mold frame and fix the upper mold frame so that the foamed mass 40 permeates through the through-holes 38 of the intermediate layer 34 at a state where the laminated structure is securely fixed upon the foaming of the foamed mass 40.

The reason for this is that if the foamed mass 40 of the foaming material is not applied with a resistance of the laminated structure, there occurs a case where the volume increases entirely merely but the foamed mass 40 is not escaped from the through-holes 38.

In the meantime, in case where the permeable reinforcing member 20 is included in the bed mattress, the bonding performance of the spring assembly 10 and the foaming material is improved, thereby maximizing the bonding force between the spring assembly 10 and the foaming material as well as enhancing a buffering function through even distribution and absorption of a load of a sleeper.

As such, since the present invention enables the spring assembly 10, the permeable reinforcing member 20 and the intermediate layer 34 to be fixedly bonded integrally with the cushion material 36 as a foaming material by means of the foamed mass without a separate fixing apparatus, the bonding strength between the spring assembly 10 and the cushion material 36 is relatively increased as compared to a conventional manufacturing process to thereby prolong the lifespan of the bed mattress. Also, since the foamed mass 40 is coagulated at the springs 12 or the helical coils 14, a noise generated due to the contact between the coil springs 12 themselves is reduced as well as a crack risk of the helical coils 14 is lowered to thereby increase the lifespan of the interior springs.

Further, in the conventional manufacturing process of the bed mattress, the intermediate layer member such as a felt, a non-woven fabric and a palm is independently bonded to the upper and lower portions of the spring assembly, which leads to an increase in the number of working processes and a load. However, in the manufacturing process of the bed mattress according to the present invention, the foaming material permeates through the through-holes of the intermediate layer and is strongly assembled with the spring assembly to thereby simplify the manufacturing process.

As apparent from the foregoing, according to the present invention regarding a bed mattress using a permeable reinforcing member and a foaming material, and a method of manufacturing the same, the permeable reinforcing member having fine holes and a plurality of foam expansion holes is provided at an upper portion and/or a lower portion of a spring assembly for the bed mattress, and a foaming material is disposed on the permeable reinforcing member so as to be foamed, so that the permeable reinforcing member is embedded into the foaming material and simultaneously the foaming degree of the foaming material is further increased through the foam expansion holes, and the engagement portion between the spring of the spring assembly and the helical coil, and/or the seam portion between the springs or the space portion between the springs are embedded into the foaming material expanded through the foam expansion holes, to thereby provide an excellent bonding force between the spring assembly including the springs and the foaming material.

Moreover, the present invention enables the elimination of various processes including a process in which a multi-layered intermediate member such as a felt and a non-woven fabric is laminatedly attached on the upper and lower surfaces of the spring assembly, and a process of bonding the intermediate member, etc., so that the manufacturing cost and the labor cost can be substantially reduced and unit productivity can be improved.

Particularly, since the present invention has a structure in which the springs and a helical coil portion for securely engaging the springs with one another is surrounded by the foaming material, the foaming material absorbs a noise caused by the friction between the helical coils and adjacent springs due to a load exerted to the mattress in its use so as to suppress a noise generation.

Furthermore, in the present invention, the foamed mass expanded convexedly through the through-holes of the intermediate layer is fixedly bonded to the permeable reinforcing member, the spring assembly and the helical coil, to thereby relatively increase the bonding strength between the spring assembly 10 and the foaming material as compared to a conventional manufacturing process to prolong the lifespan of the bed mattress. Also, since the foamed mass is coagulated at the springs or the helical coils, a noise of the coil springs themselves is reduced as well as a crack risk of the helical coils is decreased to thereby prolong the lifespan of the interior springs.

In addition, in the conventional manufacturing process of the bed mattress, the intermediate layer member such as a felt, a non-woven fabric and a palm is independently bonded to the upper and lower portions of the spring assembly, which leads to an increase in the number of working processes and a load. However, in the manufacturing process of the bed mattress according to the present invention, the foaming material permeates through the through-holes of the intermediate layer and is strongly assembled with the spring assembly to thereby simplify the manufacturing process.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A bed mattress including a spring assembly consisting of a plurality of springs arranged along row and column directions over the entire area of the bed mattress, and a helical coil for securely engaging the springs with one another, the bed mattress comprising:
   a foaming material; and
   a permeable reinforcing member formed of a single or multi-layered structure provided between the foaming material and an upper surface of the spring assembly and/or between the foaming material and a lower surface of the spring assembly, the permeable reinforcing member including (i) a plurality of fine holes through which the foaming material can pass and (ii) a plurality of foam expansion holes which are larger than the fine holes and through which a part of the foaming material can be convexedly foamed, the foam expansion holes being spaced apart from each other and arranged along row and column directions at positions above or below the positions where engagement portions between each of the springs and the helical coil exist, the positions where seam portions between the springs exist, and/or the positions where space portions between the springs exist,
   wherein the permeable reinforcing member is embedded into the foaming material by the foaming material passing through the fine holes of the permeable reinforcing member, and
   wherein the engagement portions, the seam portions, and/or the space portions are embedded into the convexedly foamed part of the foaming material by the foaming material passing through the foam expansion holes, thereby enhancing bonding force between the spring assembly and the foaming material and preventing a noise that can be generated due to contact between the springs.

2. The bed mattress as set forth in claim 1, wherein each of the fine holes of the permeable reinforcing member is 1~30 mm×1~30 mm in size and/or foam expansion holes each of which is 3 mm to 80 mm in diameter.

3. The bed mattress as set forth in claim 2, wherein each of the foam expansion holes of the permeable reinforcing member is 3 mm to 80 mm in diameter.

4. The bed mattress as set forth in claim 1, wherein an edge foamer is fittingly attached to the lateral surface of the spring assembly, but a lateral foaming material is not foamed along the lateral surface of the spring assembly.

\* \* \* \* \*